US008625500B2

(12) United States Patent
Wang et al.

(10) Patent No.: US 8,625,500 B2
(45) Date of Patent: Jan. 7, 2014

(54) ENHANCED DYNAMICAL FAST-FEEDBACK CHANNEL ALLOCATIONS

(75) Inventors: Xiao Yi Wang, Beijing (CN); Xin Qi, Beijing (CN); Hao Guan, Beijing (CN); Shashikant Maheshwari, Irving, TX (US)

(73) Assignee: Nokia Siemens Networks Oy, Espoo (FI)

( * ) Notice: Subject to any disclaimer, the term of this patent is extended or adjusted under 35 U.S.C. 154(b) by 1190 days.

(21) Appl. No.: 12/229,792

(22) Filed: Aug. 26, 2008

(65) Prior Publication Data

US 2009/0154412 A1    Jun. 18, 2009

Related U.S. Application Data

(60) Provisional application No. 61/008,094, filed on Dec. 18, 2007.

(51) Int. Cl.
*H04W 4/00* (2009.01)

(52) U.S. Cl.
USPC ........................................................ 370/329

(58) Field of Classification Search
USPC .......................................... 370/329, 341, 348
See application file for complete search history.

(56) References Cited

U.S. PATENT DOCUMENTS

| 6,539,022 B1 * | 3/2003 | Virgile ........................... 370/401 |
| 2007/0155392 A1 | 7/2007 | Cho et al. ....................... 455/450 |
| 2008/0089354 A1 * | 4/2008 | Yoon et al. ...................... 370/432 |
| 2008/0159211 A1 | 7/2008 | Kwon et al. .................... 370/329 |
| 2008/0227476 A1 * | 9/2008 | Cho et al. ....................... 455/522 |
| 2009/0131066 A1 * | 5/2009 | Barve et al. ................. 455/452.2 |

FOREIGN PATENT DOCUMENTS

| WO | WO 2005/099290 A1 | 10/2005 |
| WO | WO 2006/043773 A2 | 4/2006 |

OTHER PUBLICATIONS

IEEE 802.16m, System Requirements, Oct. 19, 2007, Broadband Wireless Access Working Group—Advanced Air Interface, pp. 1-26.
IEEE 802.16e, Air Interface for Fixed Broadband Wireless Access Systems, Amendment 2: Physical and Medium Access Control Layers for Combined Fixed and Mobile Operation in Licensed Bands and Corrigendum 1 (2005), Feb. 28, 2006, pp. 439-448 (including Sections 8.4.5.4.10, Fast-feedback channels, 8.4.5.410.1, Fast DL measurement feedback, 8.4.5.4.10.2, Fast MIMO feedback, 8.4.5.410.5, Enhanced Fast-feedback channels)and pp. 468-471 (Section 8.4.5.4.12, CQICH Allocation IE Format).
IEEE 802.16—2004, Standard for Local and Metropolitan Area Networks Part 16: Air Interface for Fixed Broadband Wireless Access Systems, Oct. 1, 2004.

* cited by examiner

*Primary Examiner* — Mark Rinehart
*Assistant Examiner* — Mohammad Anwar
(74) *Attorney, Agent, or Firm* — Harrington & Smith

(57) ABSTRACT

A method includes allocating channels in a fast-feedback channel region for a plurality of devices, and transmitting to the plurality of devices at least one bitmap defining fast-feedback uplink channel allocations for individual ones of the plurality of devices. In one embodiment a plurality of bitmaps are transmitted, the plurality of bit maps together informing individual ones of the plurality of devices of permission to use none, one or more than one particular fast-feedback channel. In this case each bitmap includes a plurality n of bit positions corresponding to n indices, where each device is identified by an associated one of the n indices, and where a bit at an index value p in a first bitmap and a bit at the same index value p in a second bitmap, when concatenated together, equal a number of fast-feedback uplink channels that are allocated to a particular device associated with the index value p.

50 Claims, 7 Drawing Sheets

| SYNTAX | SIZE | NOTES |
|---|---|---|
| CQICH_Alloc_IE()<br>(){ | | |
| Extended UIUC | 4 bits | CQICH=0x03 |
| Length | 4 bits | Length of the message in bytes (variable). |
| CQICH_ID | variable | Index to uniquely identify the CQICH resource assigned to the SS. The size of this field is dependent on system parameter defined in UCD. |
| Allocation offset | 6 bits | Index to the fast-feedback channel region marked by UIUC=0. |
| Period (p) | 2 bits | If (p!=3) CQI feedback is transmitted on the CQICH every $2^p$ frames.<br>else, bitmap method is used, allocation offset is the bitmap index. |
| Frame offset | 3 bits | The SS starts reporting at the frame of which the number has the same 3 LSB as the specified frame offset. If the current frame is specified, the SS should start reporting in eight frames. |

FIG.4A

| SYNTAX | SIZE | NOTES |
|---|---|---|
| CQICH_IndexMASK_Alloc_IE()<br>(){ | | |
| Extended-2 UIUC | 4 bits | CQICH=0xxxx |
| IndexMASK | 8 bits | Index in CQICH dynamical allocation bitmap. If it is "0", SS should stop use dynamical CQICH allocation. |

FIG.4B

ENHANCED DYNAMICAL FAST-FEEDBACK CHANNEL ALLOCATIONS

CLAIM OF PRIORITY FROM COPENDING PROVISIONAL PATENT APPLICATION

This patent application claims priority under 35 U.S.C. §119(e) from Provisional Patent Application No. 61/008,094, filed Dec. 18, 2007, the disclosure of which is incorporated by reference herein in its entirety.

TECHNICAL FIELD

The exemplary and non-limiting embodiments of this invention relate generally to wireless communication systems, methods, devices and computer programs and, more specifically, relate to techniques for providing feedback through a wireless link between a subscriber station and a base station.

BACKGROUND

Various abbreviations that appear in the specification and/or in the drawing figures are defined as follows:
ACK acknowledgment
BS base station
BWA broadband wireless access
CQI channel quality indicator
CQICH channel quality indicator channel
DL downlink (from BS to SS)
ID identification
IE information element
LA link adaptation
MAC medium access control (layer 2)
MAP media access protocol
NACK negative acknowledgment
OFDMA orthogonal frequency division multiple access
PHY physical (layer 1)
SS subscriber station (also referred to as a mobile station (MS))
UIUC uplink interval usage code
UL uplink (SS to BS)

The IEEE 802.16 working group has established a task group, 802.16m, to provide an advanced air interface which amends IEEE 802.16-2004, Air Interface for Fixed Broadband Wireless Access Systems, and also IEEE 802.16e, Air Interface for Fixed Broadband Wireless Access Systems, Amendment 2: Physical and Medium Access Control Layers for Combined Fixed and Mobile Operation in Licensed Bands and Corrigendum 1 (2005), in order to meet the requirements of next generation mobile networks. Reference may be had, for example, to IEEE 802.16 Broadband Wireless Access Working Group, IEEE 802.16m System Requirements, 2007-10-19.

The foregoing referenced IEEE 802.16 standards were designed to support fixed, nomadic and mobile clients in a BWA network. These standards provide different scheduling services to satisfy the demands for various multimedia services. Link adaptation is used to enhance spectrum efficiency. Since the LA is performed by the BS, for a DL transmission an UL fast-feedback channel is needed to transmit the CQI. The fast-feedback channel is a PHY channel that does not require MAC decoding. The goal is to provide a low latency CQI signaling technique.

A "semidynamic" technique to achieve a fast-feedback channel allocation has been adopted in current IEEE 802.16 systems. First, the BS sends an index to each SS (e.g., in a CQICH_Alloc_IE). If plural SSs have the same index they share the corresponding CQI channel. Then the BS dynamically allocates a fast-feedback region for every frame. Using the region information the SS can locate its own fast-feedback channel by using its own index. The index allocation may be considered as being semi-dynamic since related messages are designed to be transmitted only occasionally, while the fast-feedback region is allocated dynamically.

This type of semi-dynamic method is relatively simple to implement, and is a generally efficient way to allocate fast-feedback channels to SSs. However, it can be wasteful of the fast-feedback channels under certain conditions.

One condition of interest occurs when a particular SS stops using the fast-feedback channel. In the current method messages such as CQICH_alloc_IE are needed to adjust the index of other SSs accordingly to avoid generating gaps in the fast-feedback region (i.e., some feedback channels are not used). In some particular use cases, for example a Web browser that frequently starts or stops downlink transmission, such index allocations can be required frequently.

Another condition of interest concerns those SSs that may not require feedback at every frame. To accommodate this condition the CQICH control IE also assigns an interval number to SSs (e.g., 1, 2, 4, 8). However, this technique does not guarantee a full occupation of the fast-feedback region. For example, assume a case of five users with an interval of eight. In this case some feedback channels are not utilized, thereby wasting bandwidth.

In practice the semi-dynamic mechanism may at least partially address this second problem. For example, since the interval can only be 1, 2, 4, 8, the BS can ensure that the fast-feedback channel is not fully occupied. Then the dynamical fast-feedback region allocation can ensure that no channels are wasted.

However, when considering the first and second problems together this solution will result in large numbers of index adjust messages being sent, which in turn requires a large signaling overhead. For example, when a low index SS is present the BS needs to adjust a series of SSs indices.

To summarize, in IEEE 802.16e the SS is allocated a "CQICH channel allocation index" in the fast-feedback region for reporting CQI feedback, and a CQICH-Allocation IE is used for allocation and de-allocation of the fast-feedback channel. When the CQICH channel is once allocated it is fixed, and the SS reports periodic CQI feedback. No further signaling is transmitted. When the CQICH channel for a particular SS is allocated/de-allocated "holes" (unused UL bandwidth) can be created in the fast-feedback channel structure. If the presence of these holes is not addressed then resources are wasted. Alternatively, if some of the SS CQICH channels are reconfigured, then additional signaling overhead is required.

Selected portions of IEEE 802.16e, Air Interface for Fixed Broadband Wireless Access Systems, Amendment 2: Physical and Medium Access Control Layers for Combined Fixed and Mobile Operation in Licensed Bands and Corrigendum 1 (2005) that are of particular interest, and that are incorporated by reference herein, include pages 439-448 (including Sections 8.4.5.4.10, Fast-feedback channels, 8.4.5.4.10.1, Fast DL measurement feedback, 8.4.5.4.10.2, Fast MIMO feedback, 8.4.5.4.10.5, Enhanced Fast-feedback channels) and pages 468-471 (Section 8.4.5.4.12, CQICH Allocation IE Format).

SUMMARY OF THE EXEMPLARY EMBODIMENTS

The foregoing and other problems are overcome, and other advantages are realized, by the use of the exemplary embodiments of this invention.

In a first aspect thereof the exemplary embodiments of this invention provide a method that comprises allocating channels in a fast-feedback channel region for a plurality of devices; and transmitting to the plurality of devices at least one bitmap defining fast-feedback uplink channel allocations for individual ones of the plurality of devices.

In another aspect thereof the exemplary embodiments of this invention provide a computer-readable memory medium that stores program instructions, the execution of which result in performing operations that comprise allocating channels in a fast-feedback channel region for a plurality of devices; and transmitting to the plurality of devices at least one bitmap defining fast-feedback uplink channel allocations for individual ones of the plurality of devices.

In another aspect thereof the exemplary embodiments of this invention provide an apparatus that includes a wireless transmitter and a controller, configurable with said transmitter, to allocate channels in a fast-feedback channel region to a plurality of devices and to transmit to the plurality of devices at least one bitmap defining fast-feedback uplink channel allocations for individual ones of the plurality of devices.

In a further aspect thereof the exemplary embodiments of this invention provide a method that includes receiving at a device at least one bitmap defining fast-feedback uplink channel allocations for individual ones of a plurality of devices; determining if the device has at least one defined fast-feedback uplink channel allocation in the at least one received bitmap and, if it is determined that the device does have at least one defined uplink channel allocation in the at least one received bitmap, using the at least one defined uplink channel allocation to transmit feedback information.

In yet another aspect thereof the exemplary embodiments of this invention provide a computer-readable memory medium that stores program instructions, the execution of which result in performing operations that comprise receiving at a device at least one bitmap defining fast-feedback uplink channel allocations for individual ones of a plurality of devices; determining if the device has at least one defined fast-feedback uplink channel allocation in the at least one received bitmap and, if it is determined that the device does have at least one defined uplink channel allocation in the at least one received bitmap, using the at least one defined uplink channel allocation to transmit feedback information.

In a still further aspect thereof the exemplary embodiments of this invention provide an apparatus that comprises a wireless transmitter; a wireless receiver and a controller configurable with the transmitter and the receiver in a device to receive at least one bitmap defining fast-feedback uplink channel allocations for individual ones of a plurality of devices. The controller is further configurable to determine if the device has at least one defined fast-feedback uplink channel allocation in the at least one received bitmap and, if the controller does determines that the device does have at least one defined uplink channel allocation in the at least one received bitmap, the controller is further configurable to use the at least one defined uplink channel allocation to transmit feedback information.

BRIEF DESCRIPTION OF THE DRAWINGS

In the attached Drawing Figures:

FIG. 4A shows a Table depicting a modification of the CQICH_Alloc_IE for use with the fast-feedback bitmap in accordance with the disclosure of U.S. Provisional Patent Application No. 61/008,094.

FIG. 4B shows an information element for indicating to a SS the bitmap index, further in accordance with the disclosure of U.S. Provisional Patent Application No. 61/008,094.

DETAILED DESCRIPTION

In U.S. Provisional Patent Application No. 61/008,094, filed Dec. 18, 2007, the inventors describe the use of dynamic CQICH shifting of the CQICH index for a case where each MS has one fast-feedback channel of fixed size. Recently requirements have arisen in IEEE 802.16m to have a flexible size of the fast-feedback channel so that various feedback types may be transmitted together. One possible result is that each MS has more than one CQICH (where the CQICH has a fixed size).

Figure 1:
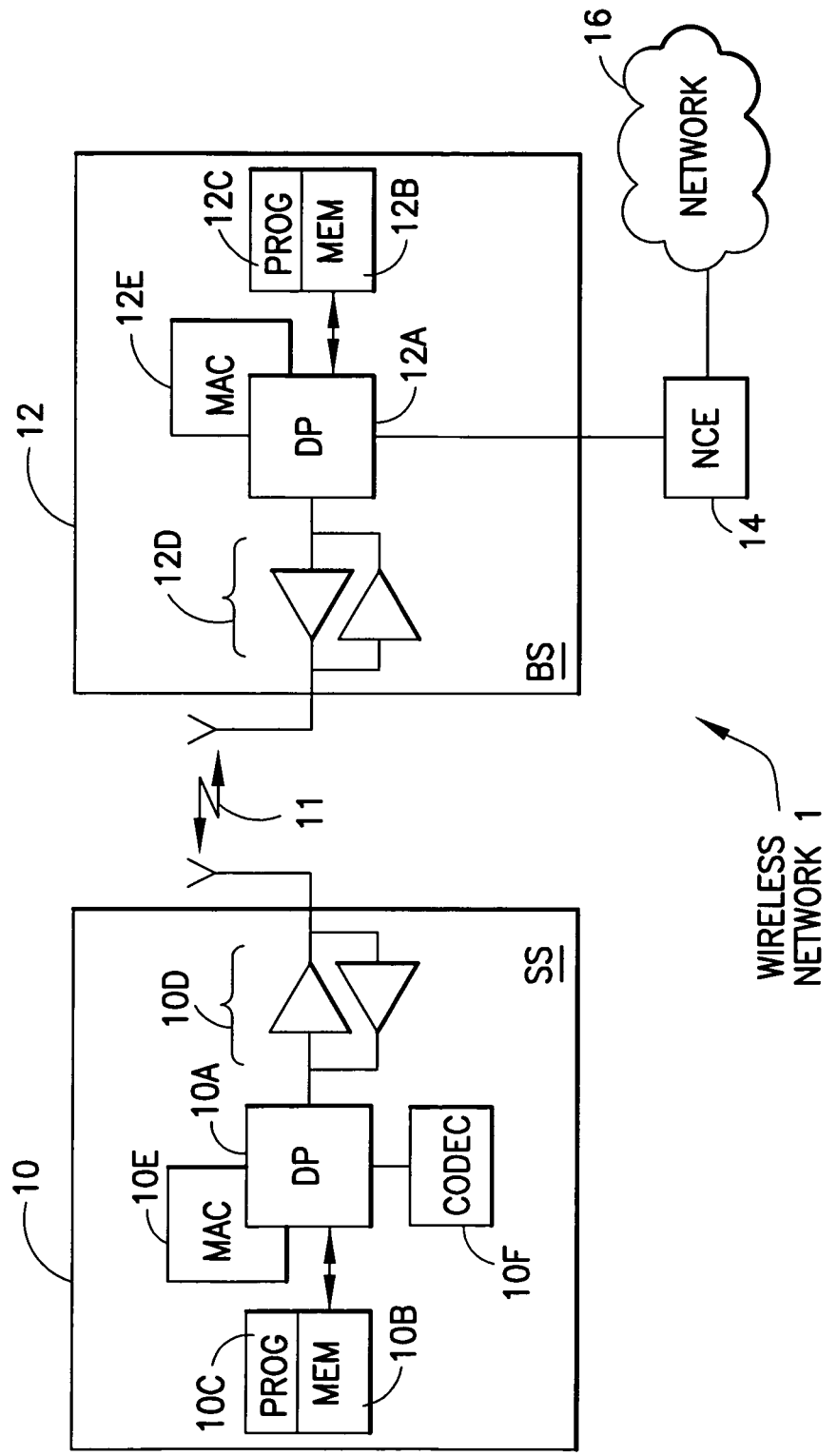
FIG. 1 shows a simplified block diagram of various electronic devices that are suitable for use in practicing the exemplary embodiments of this invention.

Reference is made first to FIG. 1 for illustrating a simplified block diagram of various electronic devices and apparatus that are suitable for use in practicing the exemplary embodiments of this invention. In FIG. 1 a wireless network 1 is adapted for communication with a device, which may be referred to as a SS 10, via a BS 12 over a wireless link 11. The network 1 may include a network control element (NCE) 14 that provides connectivity to another network 16 or networks, such as the Internet. The SS 10 includes at least one controller embodied as a computer or data processor (DP) 10A, a computer-readable memory medium embodied as at least one memory (MEM) 10B that stores program instructions (PROG) 10C, and a suitable radio frequency (RF) transceiver 10D for bidirectional wireless communications with the BS 12, which also includes at least one controller embodied as a computer or data processor (DP) 12A, a computer-readable memory medium embodied as at least one MEM 12B that stores a PROG 12C, and a suitable RF transceiver 12D. At least one of the PROGs 10C and 12C is assumed to include program instructions that, when executed by the associated DP, enable the electronic device to operate in accordance with the exemplary embodiments of this invention, as will be discussed below in greater detail. That is, the exemplary embodiments of this invention may be implemented at least in part by computer software executable by the DP 10A of the SS 10 and by the DP 12A of the BS 12, or by hardware, or by a combination of software and hardware.

The SS 10 and the BS 12 will typically include a MAC layer 10E, 12E, and the SS 10 may include a codec 10F that is useful for conducting voice communications.

In general, the various embodiments of the SS 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B and 12B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A and 12A may be of any type suitable to the local technical environment, and may include one or more of general purpose computers, special purpose computers, microprocessors, digital signal processors (DSPs) and processors based on a multi-core processor architecture, as non-limiting examples.

Figure 2:
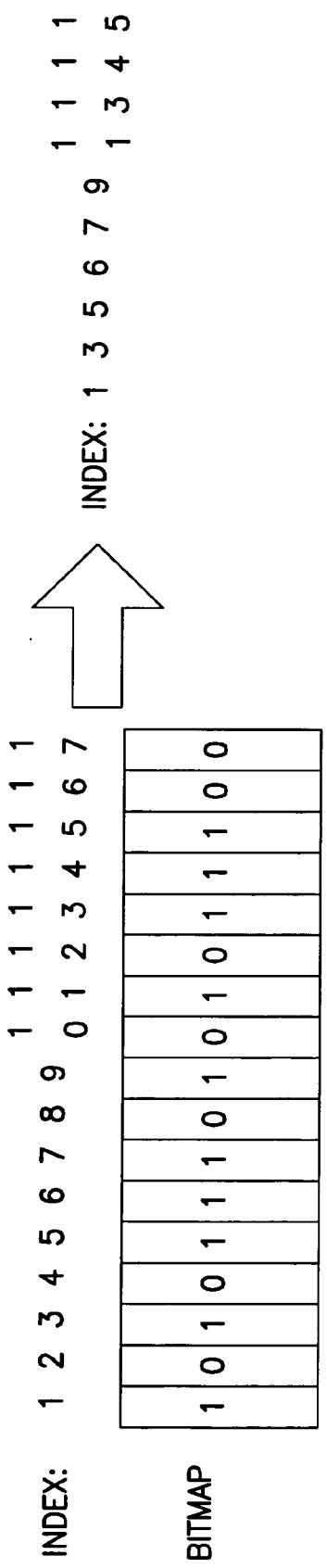
FIG. 2 illustrates an example of a bitmap to indicate fast-feedback channel usage in accordance with the disclosure of U.S. Provisional Patent Application No. 61/008,094.
Figure 3:
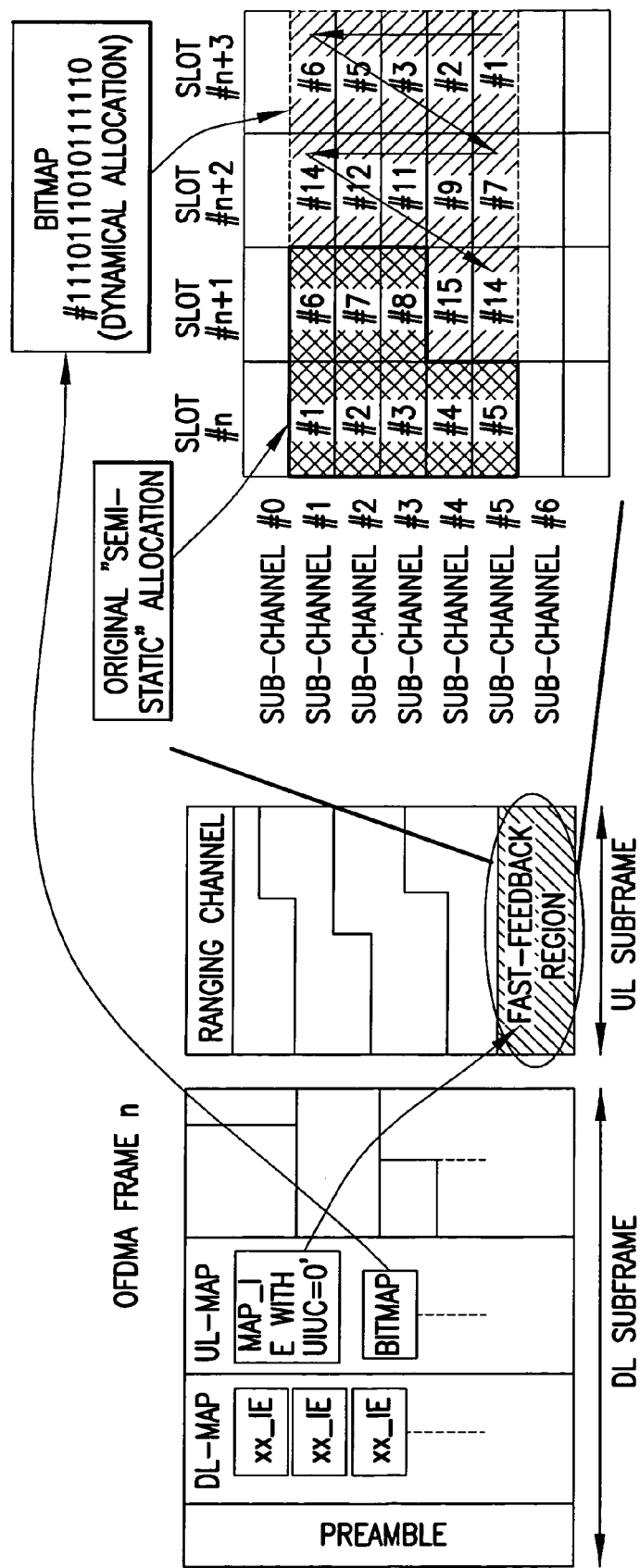
FIG. 3 shows the bitmap indicating fast-feedback channel allocations as part of the UL-MAP, and the placement of the fast-feedback region within an UL ranging channel.

Referring to FIGS. 2 and 3, in accordance with exemplary embodiments of this invention a bitmap is transmitted as an extended UL_MAP_IE, in which each bit represents whether a corresponding SS 10 (bitmap index allocated by the BS 12) should use a fast-feedback channel or should not use a fast-feedback channel. In that the bitmap is broadcast to every SS 10, a compact fast-feedback occupation can be achieved. For example, if the bit map is four bits that have states of:1010, then the SS 10 (user1) with "bitmap index=1" should send fast-feedback, but the user2 (index=2) should not. The user3 (index=3) can determine that it should occupy fast-feedback channel 2, since it can be readily seen from the broadcast bitmap that user2 will not occupy fast-feedback channel 2. In general, since the bitmap is broadcast to all of the SSs 10 that communicate with the BS 12, each SS 10 can determine itself which fast-feedback channel it should occupy.

Note in FIG. 3 that the fast-feedback region is divided into two parts, where the first part uses original (conventional) semi-dynamical CQI channel allocations, while the second part uses the bitmap of FIG. 2 in accordance with the dynamical allocation technique that is a non-limiting aspect of this invention.

In general, if bitmap[index]==1 for a given SS 10, then "User actual occupied channel index"="bitmap index"–"number of zeroes before bitmap index"; while if bitmap [index]=0, the SS 10 does not use the fast-feedback channel in the current frame.

In order to reduce overhead it is desirable to limit the length of the bitmap. The BS 12 determines which SSs 10 are assigned a one in the bitmap index, and the BS 12 may send a message to assign or dismiss the bitmap index to/from any SS 10.

By the use of these exemplary embodiments the SSs 10 occupy the fast-feedback channels compactly, and there is no wasted bandwidth due to gaps between actually used fast-feedback channels. In addition, the use of this technique provides a mechanism to flexibly turn on/off any fast-feedback channel in a dynamic manner. This is an important advantage due to the nature of the DL traffic, which in many cases is not constant (e.g., when the SS 10 is using a web browser).

Considering backwards compatibility, the UL-MAP-IE with UIUC=0 to dynamically allocate the fast-feedback region is maintained. In every frame this UL-MAP-IE dynamically indicates the fast-feedback region.

The BS 12 determines whether a given SS 10 should use the dynamic fast-feedback allocation or should not use it. If a given SS 10 should use the dynamic fast-feedback, the BS 12 sends the bitmap index to the SS 10. There are at least two options for allocating the bitmap index for users. A first option defines a new message IE for the bitmap index. FIG. 4B shows a non-limiting example of a new message IE for indicating to the SS 10 the bitmap index. A second option reuses the CQICH_Alloc_IE to transmit the bitmap index. Reference in this regard can be made to the Table shown in FIG. 4A. For example, if the 2-bit Period field of the CQICH_Alloc_IE is (p!=3), the CQI feedback is transmitted on the CQICH every $2^p$ frames, else the bitmap technique is used where the allocation offset is the bitmap index. The remainder of the CQICH_Alloc_IE may be as specified in IEEE 802.16e (pages 468-471, Section 8.4.5.4.12, CQICH Allocation IE Format).

For those SSs 10 with bitmap indexes, and as an example, the channel index begins from the end of the dynamically allocated feedback region towards the beginning. In this manner the semi-dynamic (conventional) method can be used together with the dynamical fast-feedback allocations, as shown in FIG. 3.

A limited number of SSs 10 may use bitmap method due to a limited length of the bitmap. For those SSs 10 using the semi-dynamic method, the CQICH_Control_IE or CQICH_Alloc_IE may still be used for the allocation index (not the bitmap index). For example, for those SSs 10 needing to feedback in every frame, these users may have a constant interval of feedback.

The use of the bitmap in every frame enables the fast-feedback region to be fully occupied, as shown in FIG. 3.

Based on the foregoing it should be apparent that exemplary embodiments of the invention provide a method, apparatus and computer program(s) to enhance the provision of fast-feedback channel usage in a dynamic (e.g., frame-by-frame) manner.

Figure 5:
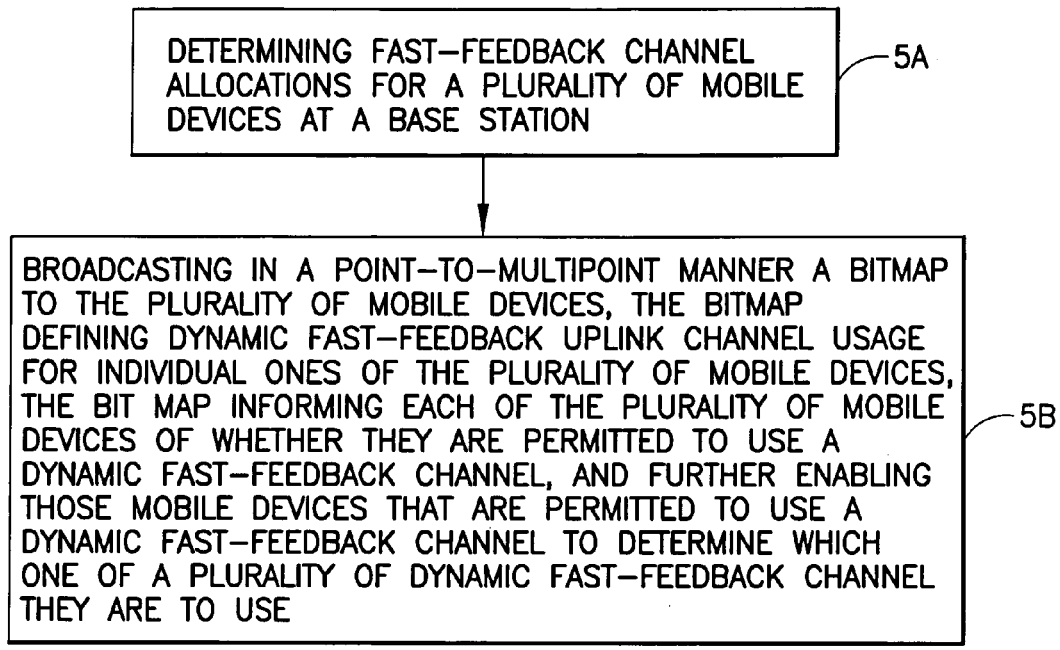
FIGS. 5 and 6 are logic flow diagrams of methods, and the result of execution of computer program instructions, for the BS and the SS, respectively, shown in FIG. 1, in accordance with the disclosure of U.S. Provisional Patent Application No. 61/008,094.

Referring to FIG. 5, a method comprises (Block 5A) determining fast-feedback channel allocations for a plurality of mobile devices at a base station; and (Block 5B) broadcasting in a point-to-multipoint manner a bitmap to the plurality of mobile devices, the bitmap defining dynamic fast-feedback uplink channel usage for individual ones of the plurality of mobile devices, the bit map informing each of the plurality of mobile devices of whether they are permitted to use a dynamic fast-feedback channel, and further enabling those mobile devices that are permitted to use to a dynamic fast-feedback channel to determine which one of a plurality of dynamic fast-feedback channel they are to use.

Figure 6:
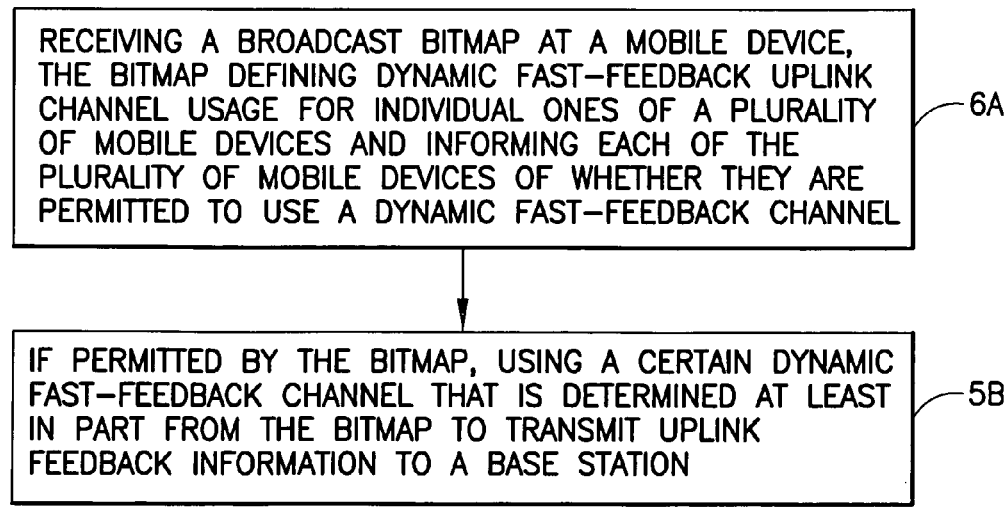

Referring to FIG. 6, a further method comprises (Block 6A) receiving a broadcast bitmap at a mobile device, the bitmap defining dynamic fast-feedback uplink channel usage for individual ones of a plurality of mobile devices and informing each of the plurality of mobile devices of whether they are permitted to use a dynamic fast-feedback channel, and (Block 6B) if permitted by the bitmap, using a certain dynamic fast-feedback channel that is determined at least in part from the bitmap to transmit uplink feedback information to a base station.

The methods of the preceding paragraphs, where the dynamic fast-feedback channels to be used begin at an end of a fast-feedback channel region, and are allocated sequentially and without gaps to the mobile devices in a direction towards a beginning of the fast-feedback channel region.

The method of the preceding paragraph, where a beginning part of the fast-feedback channel region is used for semi-static feedback channel allocations.

The method of the preceding paragraphs, where broadcasting occurs in a downlink sub-frame on a frame-by-frame basis.

The method of the preceding paragraphs, where the mobile device is instructed whether to use or not use the broadcast bitmap in Period field of a CQICH_Alloc_IE.

Having thus described the exemplary embodiments of the invention in accordance with the disclosure of U.S. Provisional Patent Application No. 61/008,094, what follows is a description of the exemplary embodiments of the present invention that provide enhanced dynamical fast-feedback channel allocations.

It can be noted with respect to the procedures in accordance with the disclosure of U.S. Provisional Patent Application No. 61/008,094 that the BS 12 may not transmit the bitmap in each frame and, in this case, the SS 10 may use the original CQICH to transmit the CQI.

Figure 7:
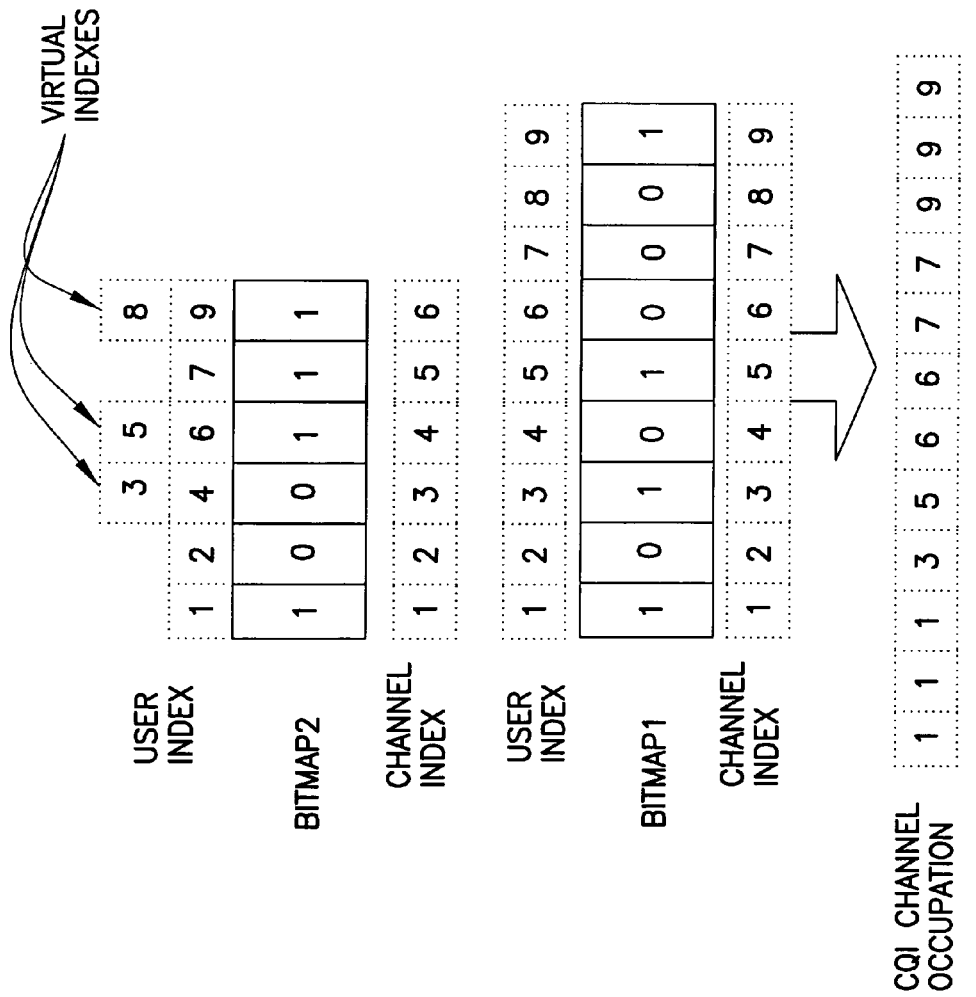
FIG. 7 depicts the use of multiple bitmaps transmitted from the BS of FIG. 1 to indicate fast-feedback channel usage, in accordance with the exemplary embodiments of this invention.

In accordance with the exemplary embodiments of this invention, and referring to FIG. 7, multiple bitmaps are broadcast from the BS 12 to the SSs 10. The SSs 10 are assigned an index for each bitmap (the index in bitmap1 may be the same as the conventionally-assigned CQICH index). Upon receiving the bitmaps (e.g., bitmap1 and bitmap2) the SS 10 locates its corresponding bit (based on its index) in each received bitmap, and then concatenates all bits together as an indication of how many fast-feedback channels it should occupy. The BS 12 may use a virtual index for the SS 10 in some particular bitmap (not in bitmap1) if desired. In this case the bit indicated by the virtual index is always considered as a 0 (zero) by the corresponding SS 10 that has knowledge of the virtual index value.

Note that a given SS 10 may be assigned the same index value for each bitmap, or it may be assigned a first index value for bitmap1, and a second, different, index value for bitmap2.

In the example shown in FIG. 7, which assumes the non-limiting case of two bitmaps, the SSs 10 associated with user indices 1 and 9 each receive a 1 bit in bitmap1 and a 1 bit in bitmap2. Concatenating these two bits together yields 11=3 fast-feedback channels that are assigned to each of these SSs. The SSs 10 associated with user indices 2 and 4 each receive a 0 bit in bitmap1 and a 0 bit in bitmap2. Concatenating these two bits together yields 00=0 fast-feedback channels that are assigned to each of these SSs. The SSs 10 associated with user indices 3 and 5 each receives a 1 bit in bitmap1, and a default 0 bit in the virtual index of bitmap2. Concatenating these two bits together yields 01=1 fast-feedback channel that is assigned to each of these SSs. Further by example, the SSs 10 associated with user indices 6 and 7 each receive a 0 bit in bitmap1 and a 1 bit in bitmap2. Concatenating these two bits together yields 10=2 fast-feedback channels that are assigned to each of these SSs. The SS 10 associated with user index 8 receives a 0 bit in bitmap1 and a default 0 bit in the virtual index of bitmap2. Concatenating these two bits together yields 00=0 fast-feedback channels. In general, the starting point is determined by the number of 1s before the index. In bitmap2, and considering user index 7, there are 2 "1" bits ahead of the index, and 3 "1" bits in bitmap1. As a result, user 7 occupies two fast-feedback channels starting at fast-feedback channel 8 (2*2+3*1+1). Note that if three bitmaps are transmitted, then there is a possibility to assign up to 111=7 fast-feedback channels to a particular SS 10.

This approach thus provides a compact technique to achieve fast-feedback channel assignments to a plurality of SSs 10. Using this enhanced dynamic fast-feedback channel allocation procedure the BS 12 can allocate multiple fast-feedback channels to any particular SS 10 using little signaling overhead, enabling a particular SS 10 to have a variable number of bits of feedback.

Considering backwards compatibility, the UL-MAP-IE with UIUC=0 to dynamically allocate fast-feedback region may be retained, and in every frame the UL-MAP-IE dynamically indicates the fast-feedback region.

Then BS 12 decides whether to send CQICH shifting indices at every frame or sub-frame. Upon receiving the bitmap(s) the SS 10 shifts its CQICH index accordingly and transmits corresponding feedback in this frame. The use of the bitmap in every frame enables full occupation on fast-feedback region to be accomplished, thereby efficiently using the UL resource, and the use of multiple bitmaps provides support for the case where a particular SS 10 has more than one CQICH.

It should be noted that the BS 12 need not send the bitmap in every frame or subframe. It should be further noted that, as stated above, a particular SS 10 need not be assigned the same index value in each bitmap. For example, in the first bitmap a particular SS 10 may be assigned index p1, while in the second bitmap the same SS 10 may be assigned index value p2, where p1 does not equal p2.

Further in accordance with the exemplary embodiments of this invention the BS 12 may repack the fast feedback region by a permanent shifting of the CQICH channel allocations of all active SSs 10 in a particular frame. This procedure may be used to remove all the holes in the fast feedback region, and may be used by the BS 12 if it determines that more holes are created in fast feedback region because of allocation/de-allocation of some SSs 10, and that the cost of the overhead associated with the permanent shifting of the CQICH channels of the SSs 10 is less than the benefit achieved by removing the holes. The decision as to when to apply the repacking of the fast feedback region (permanent shifting) may thus be considered to be implementation specific.

Note that in this particular embodiment the bitmap may be sent but once by the BS 12. If the BS 12 desires to shift the CQICH index once more, then the bitmap is sent again.

When shifting the CQICH allocation index permanently there are several considerations that may be taken into account by the BS 12.

For example, as the BS 12 transmits the bitmap in the MAP (broadcast signaling), and one or more of the SSs 10 may not decode MAP correctly, there may be a possibility of collision.

There are, however, proposals to handle the MAP decoding error if the bitmap is transmitted in that MAP.

There are two methods defined in IEEE 802.16e for sending CQI feedback. The first uses the CQICH channel (a maximum of a 6-bit information payload can be transmitted). The second uses a feedback header (a maximum of a 30-bit information payload can be transmitted).

While the following approaches are made with respect to the CQICH channel, these approaches are equally applicable to both the CQICH channel and the feedback header for the fast feedback channel.

Approach 1:

When the BS 12 transmits the CQICH bitmap to repack the fast-feedback region, it requests an acknowledgment (ACK) from the SSs 10. If the BS 12 does not receive an ACK from one or more of the SSs 10, it assumes that those SSs 10 are still using the previous CQICH channels. The BS 12 then reconfigures the CQICH channel of those SSs 10 using unicast signaling, or it may retransmit the bitmap.

The SSs 10 thus have two possible actions, either they send the ACK to acknowledge successful receipt and decoding of the MAP, or they send nothing because of a failure to receive the MAP. The CQICH or ACK channel is thus preferably configured to allow the BS 12 to detect the absence of an ACK from a particular SS 10.

The ACK may be sent via a separate (HARQ) ACK channel (when the SS 10 fails to decode the MAP, it sends nothing), or the ACK may be sent via the previous (old) CQICH channel (e.g., the SS 10 may send an independent codeword along with the CQI feedback).

An optional shared NAK channel may be used in a case where the SS 10 fails to decode the MAP. The location of the shared NAK channel may be predefined by system broadcast information.

The BS 12 may indicate within the bitmap IE the transaction ID and start offset of the usage of the new CQICH index. This allows sufficient time for re-transmission of the bitmap/configuration in the case where at least one SS 10 was unable to correctly decode the bitmap.

If the SS 10 has already sent the ACK via the old CQICH channel, it need not send it again if it finds the repeated bitmap in a following MAP transmission from the BS 12. If the BS 12 detects a NAK in the shared NAK channel, the BS 12 knows that at least one SS 10 has failed to decode the MAP, while if it receives an ACK from all SSs 10 of interest, it may ignore the received NAK indication.

After the start offset period expires all SSs 10 begin to send feedback in the corresponding channels. Whenever the BS 12 detects that nothing has been sent out by a SS 10 on any CQICH or ACK channel, the BS 12 assumes a signaling error to the corresponding SS 10 (MAP decoding error), and the BS 12 may reassign the index to that particular SS 10 by using unicast signaling, or by re-transmitting the same bitmap. If the number of re-assignments that are needed is excessive, the BS 12 may select to trigger another permanent shift.

Approach 2:

In this alternative approach the BS 12 repeats the bitmap in consecutive MAPs (e.g., in two or three consecutive MAPs). In this case the probability of consecutive MAP decoding is very low (e.g., 0.1%-0.01%). When bitmap is repeated the BS 12 provides the frame offset where the same bitmap was transmitted for the first time, and also a retransmission flag to indicate that the bitmap message is a repeated message. In this manner the SS 10 can determine whether it was able to decode that MAP, and if not it may then determine whether the SS 10 was to send feedback. If the SS 10 was to send feedback it adjusts its CQICH channel allocation index automatically.

If the SS 10 successfully decodes the bitmap the first time (or a subsequently re-transmitted bitmap), it ignores a further repeated bitmap that arrives with a higher offset.

When the BS 12 detects a collision in a particular channel, or that nothing has been transmitted in a particular channel), it reconfigures the CQICH channel of the associated SSs 10 using unicast signaling, or by re-transmitting the bitmap again. If the BS 12 does not detect a collision it need not repeat the bitmap.

The end result of the use of either of these two approaches is that the SSs 10 compactly occupy the feedback channels, thereby minimizing wasted bandwidth in the fast-feedback region.

The end result of the use of either of these two approaches is that there is provided a simple and efficient way of repacking the fast feedback region by permanently shifting the CQICH channel (feedback channel).

The BS 12 may implement this repacking of the fast-feedback region, and use it dynamically, when the benefit of using it is greater than the additional signaling overhead.

Figure 8:
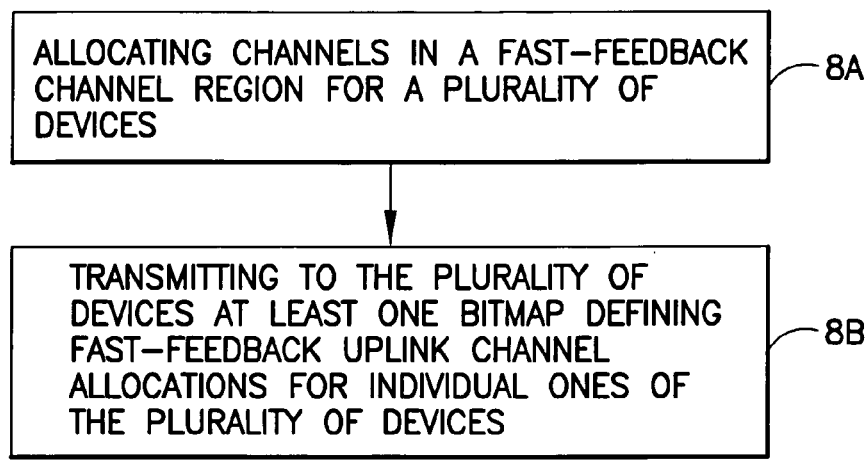
FIGS. 8 and 9 are further logic flow diagrams depicting methods, and the result of execution of computer program instructions, for the BS and the SS, respectively, shown in FIG. 1.

FIG. 8 is a further logic flow diagram depicting a method, and the result of execution of computer program instructions, for the BS 12 shown in FIG. 1. In FIG. 8 the method includes, at Block 8A, allocating channels in a fast-feedback channel region for a plurality of devices and, at Block 8B, transmitting to the plurality of devices at least one bitmap defining fast-feedback uplink channel allocations for individual ones of the plurality of devices.

In the method of the preceding paragraph, where a plurality of bitmaps are transmitted, and the plurality of bit maps together inform individual ones of the plurality of devices of permission to use none, one or more than one particular fast-feedback channel.

In the method of the preceding paragraphs, where each bitmap comprises a plurality n of bit positions corresponding to n indices, where each particular device is identified by at least one of an associated one of the n indices, and where a bit at an index value p1 in a first bitmap and a bit at an index value p2 in a second bitmap, when concatenated together, equal a number of fast-feedback uplink channels that are allocated to the particular device, where p1 may or may not be equal to p2.

In the method of the preceding paragraph, where a number of allocated fast-feedback uplink channels prior to the index values p1 and p2 defines a first fast-feedback uplink channel in a fast-feedback uplink channel region for use by the particular device.

In the method of the preceding paragraphs, where transmitting is performed using point-to-multipoint signaling.

In the method of the preceding paragraphs, where an absence of a particular index value in a bitmap other than the first bitmap is equivalent to a virtual index having a predetermined bit value, where the particular index value is known by a particular device.

In the method of the preceding paragraphs, where transmitting occurs on a frame-by-frame basis.

In the method of the preceding paragraphs, where fast-feedback channels to be used begin at an end of the fast-feedback channel region, and are allocated sequentially and without gaps to the devices in a direction towards a beginning of the fast-feedback channel region, and where a beginning part of the fast-feedback channel region is used for semi-static feedback channel allocations.

In the method of the preceding paragraphs, where a particular device is instructed whether to use or not use the at least one bitmap in a period field of a channel quality indicator channel allocation information element.

In the method of the preceding paragraphs, where transmitting comprises requesting an acknowledgment of receipt of the at least one bitmap from those devices having a fast-feedback uplink channel allocation indicated in the at least one bitmap.

In the method of the preceding paragraph, where a failure to receive an acknowledgment of receipt from a certain one of the devices results in transmitting the at least one bitmap to the certain one of the devices by unicast signaling.

In the method of the preceding paragraphs, where a failure to receive an acknowledgment of receipt from a certain one of the devices results in retransmitting the at least one bitmap using point-to-multipoint signaling.

In the method of the preceding paragraphs, where the acknowledgment of receipt is received from at least one of a hybrid automatic repeat request acknowledgment channel, a previous channel quality indicator channel, and a shared negative acknowledgment channel.

In the method of the preceding paragraphs, further comprising, in response to detecting a collision of transmissions from two of the devices on a fast-feedback channel, one of transmitting the at least one bitmap by unicast signaling or retransmitting the at least one bitmap using point-to-multipoint signaling.

In the method of the preceding paragraphs, where transmitting uses a media access protocol transmission.

In the method of the preceding paragraph, where transmitting comprising transmitting the at least one bitmap in a plurality of consecutive media access protocol transmissions.

Figure 9:
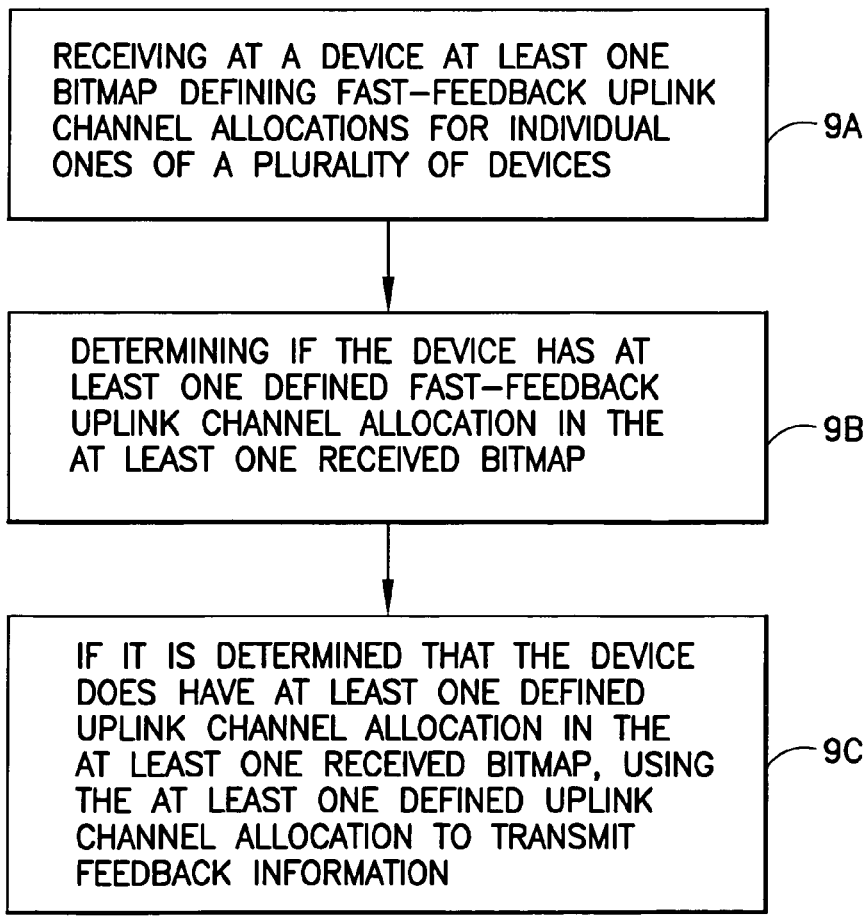

FIG. 9 is a further logic flow diagram depicting a method, and the result of execution of computer program instructions, for the SS 10 shown in FIG. 1. In FIG. 9 the method includes, at Block 9A, receiving at a device at least one bitmap defining fast-feedback uplink channel allocations for individual ones of a plurality of devices; at Block 9B, determining if the device has at least one defined fast-feedback uplink channel allocation in the at least one received bitmap; and at Block 9C, if it is determined that the device does have at least one defined uplink channel allocation in the at least one received bitmap, using the at least one defined uplink channel allocation to transmit feedback information.

In the method of the preceding paragraph, where a plurality of bitmaps are received, the plurality of bit maps together informing individual ones of the plurality of devices of permission to use none, one or more than one particular fast-feedback channel.

In the method of the preceding paragraphs, where each bitmap comprises a plurality n of bit positions corresponding to n indices, where each particular device is identified by at least one of an associated one of the n indices, and where a bit at an index value p1 in a first bitmap and a bit at an index value p2 in a second bitmap, when concatenated together, equal a number of fast-feedback uplink channels that are allocated to the particular device, where p1 may or may not be equal to p2.

In the method of the preceding paragraph, where a number of allocated fast-feedback uplink channels prior to the index values p1 and p2 defines a first fast-feedback uplink channel in a fast-feedback uplink channel region for use by the particular device.

In the method of the preceding paragraphs, where receiving receives point-to-multipoint signaling.

In the method of the preceding paragraphs, where an absence of a particular index value in a bitmap other than the first bitmap is equivalent to a virtual index having a predetermined bit value, where the particular index value is known by a particular device In the method of the preceding paragraphs, where receiving occurs on a frame-by-frame basis.

In the method of the preceding paragraphs, where fast-feedback channels to be used begin at an end of the fast-feedback channel region, and are allocated sequentially and without gaps to the devices in a direction towards a beginning of the fast-feedback channel region, and where a beginning part of the fast-feedback channel region is used for semi-static feedback channel allocations.

In the method of the preceding paragraphs, where the device is instructed whether to use or not use the at least one bitmap in a period field of a channel quality indicator channel allocation information element.

In the method of the preceding paragraphs, where receiving comprises receiving a request to send an acknowledgment of receipt of the at least one bitmap, and further comprising transmitting the acknowledgment indication if the device determines that it has at least one defined uplink channel allocation in the at least one received bitmap.

In the method of the preceding paragraph, where the acknowledgment of receipt is transmitted using at least one of a hybrid automatic repeat request acknowledgment channel, a previous channel quality indicator channel, and a shared negative acknowledgment channel.

In the method of the preceding paragraphs, where receiving receives a media access protocol transmission.

In the method of the preceding paragraph, where receiving receives the at least one bitmap in a plurality of consecutive media access protocol transmissions.

The various blocks shown in FIGS. 5, 6 8 and 9 may be viewed as method steps, and/or as operations that result from operation of computer program code, and/or as a plurality of coupled logic circuit elements/units constructed to carry out the associated function(s). These methods may be implemented in an IEEE 802.16 type of system. These methods may be implemented in an OFDMA type of system, where the fast-feedback channel region is defined by a plurality of frequency sub-channels and time slots.

It should be noted that while it has been described that the fast-feedback channels to be used begin at an end of the fast-feedback channel region, and are allocated sequentially and without gaps to the devices in a direction towards a beginning of the fast-feedback channel region, and that a beginning part of the fast-feedback channel region is used for semi-static feedback channel allocations, this particular approach need not be used for the embodiment that achieves permanent shifting of the CQICH channel allocations.

It should also be noted in each of the various embodiments described above that a particular SS 10 can be instructed whether to use or not use the at least one bitmap in a period field of a channel quality indicator channel allocation information element.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

At least some aspects of the exemplary embodiments of the inventions may be practiced in various components such as integrated circuit chips and modules.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the IEEE 802.16-type systems, it should be appreciated that the exemplary embodiments of this invention are not limited for use with only this one particular type of wireless communication system, and that they may be used to advantage in other wireless communication systems.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters and the different channels (e.g., UIUC, CQICH) are not intended to be limiting in any respect, as these various parameters and channels may be identified by any suitable names.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:
    configuring for transmission to a plurality of devices at least one bitmap defining fast-feedback uplink channel allocations for individual ones of the plurality of devices, wherein defining the fast-feedback uplink channel allocations for individual ones of the plurality of devices comprises defining which of the individual ones of the plurality of devices are and are not permitted to occupy the fast-feedback channel region, and wherein the bitmap comprises information defining sequencing of fast-feedback channel allocations, with the bitmap changing as needed in order to maintain full occupation of the fast-feedback channel region.

2. The method of claim 1, where a plurality of bitmaps are transmitted, the plurality of bit maps together informing individual ones of the plurality of devices of permission to use none, one or more than one particular fast-feedback channel.

3. The method of claim 2, where each bitmap comprises a plurality n of bit positions corresponding to n indices, where each particular device is identified by at least one of an associated one of the n indices, and where a bit at an index value p1 in a first bitmap and a bit at an index value p2 in a second bitmap, when concatenated together, equal a number of fast-feedback uplink channels that are allocated to the particular device, where p1 may or may not be equal to p2.

4. The method of claim 3, where a number of allocated fast-feedback uplink channels prior to the index values p1 and p2 defines a first fast-feedback uplink channel in a fast-feedback uplink channel region for use by the particular device.

5. The method of claim 2, where an absence of a particular index value in a bitmap other than the first bitmap is equivalent to a virtual index having a predetermined bit value, where the particular index value is known by a particular device.

6. The method of claim 1, where transmitting is performed using point-to-multipoint signaling.

7. The method of claim 6, where transmitting comprises requesting an acknowledgment of receipt of the at least one bitmap from those devices having a fast-feedback uplink channel allocation indicated in the at least one bitmap.

8. The method of claim 7, where a failure to receive an acknowledgment of receipt from a certain one of the devices results in transmitting the at least one bitmap to the certain one of the devices by unicast signaling.

9. The method of claim 7, where a failure to receive an acknowledgment of receipt from a certain one of the devices results in retransmitting the at least one bitmap using point-to-multipoint signaling.

10. The method of claim 7, where the acknowledgment of receipt is received from at least one of a hybrid automatic repeat request acknowledgment channel, a previous channel quality indicator channel, and a shared negative acknowledgment channel.

11. The method of claim 7, further comprising, in response to detecting a collision of transmissions from two of the devices on a fast-feedback channel, one of transmitting the at least one bitmap by unicast signaling or retransmitting the at least one bitmap using point-to-multipoint signaling.

12. The method of claim 1, where transmitting occurs on a frame-by-frame basis.

13. The method of claim 1, where fast-feedback channels to be used begin at an end of the fast-feedback channel region, and are allocated sequentially and without gaps to the devices in a direction towards a beginning of the fast-feedback channel region, and where a beginning part of the fast-feedback channel region is used for semi-static feedback channel allocations.

14. The method of claim 1, where a particular device is instructed whether to use or not use the at least one bitmap in a period field of a channel quality indicator channel allocation information element.

15. The method of claim 1, where transmitting uses a media access protocol transmission.

16. The method of claim 15, where transmitting comprising transmitting the at least one bitmap in a plurality of consecutive media access protocol transmissions.

17. The method of claim 1, performed as a result of execution of computer program instructions that are stored in a non-transitory computer-readable memory medium.

18. An apparatus, comprising:
    at least one processor;
    memory storing computer program code;
    wherein the computer program code is configured, with the memory and the at least one processor, to cause the apparatus to perform actions comprising at least:
    allocating channels in a fast-feedback channel region to a plurality of devices and transmitting to the plurality of devices at least one bitmap defining fast-feedback uplink channel allocations for individual ones of the plurality of devices, wherein defining the fast-feedback uplink channel allocations for individual ones of the plurality of devices comprises defining which of the individual ones of the plurality of devices are and are not permitted to occupy the fast-feedback channel region, and wherein the bitmap comprises information defining sequencing of fast-feedback channel allocations, with the bitmap changing as needed in order to maintain full occupation of the fast-feedback channel region.

19. The apparatus as in claim 18, where a plurality of bitmaps are transmitted, the plurality of bit maps together informing individual ones of the plurality of devices of permission to use none, one or more than one particular fast-feedback channel.

20. The apparatus as in claim 19, where each bitmap comprises a plurality n of bit positions corresponding to n indices, where each particular device is identified by at least one of an associated one of the n indices, and where a bit at an index value p1 in a first bitmap and a bit at an index value p2 in a second bitmap, when concatenated together, equal a number of fast-feedback uplink channels that are allocated to the particular device, where p1 may or may not be equal to p2.

21. The apparatus as in claim 20, where a number of allocated fast-feedback uplink channels prior to the index values p1 and p2 defines a first fast-feedback uplink channel in a fast-feedback uplink channel region for use by the particular device.

22. The apparatus as in claim 19, where an absence of a particular index value in a bitmap other than the first bitmap is equivalent to a virtual index having a predetermined bit value, where the particular index value is known by a particular device.

23. The apparatus as in claim 18, where said controller is configurable with said transmitter to transmit that at least one bitmap using point-to-multipoint signaling.

24. The apparatus as in claim 23, wherein the actions further comprise performing control functions to cause requesting of an acknowledgment of receipt of the at least one bitmap from those devices having a fast-feedback uplink channel allocation indicated in the at least one bitmap.

25. The apparatus as in claim 24, where the actions further comprise, upon a failure to receive an acknowledgment of receipt from a certain one of the devices, results configuring the at least one bitmap for transmission to the certain one of the devices by unicast signaling.

26. The apparatus as in claim 25, where a failure to receive an acknowledgment of receipt from a certain one of the devices results in configuring the at least one bitmap for retransmission using point-to-multipoint signaling.

27. The apparatus as in claim 24, where the acknowledgment of receipt is received from at least one of a hybrid automatic repeat request acknowledgment channel, a previous channel quality indicator channel, and a shared negative acknowledgment channel.

28. The apparatus as in claim 24, wherein the actions further comprise, in response to detection of a collision of transmissions from two of the devices on a fast-feedback channel, to configure the at least one bitmap for transmission by unicast signaling or to configure the at least one bitmap for retransmission using point-to-multipoint signaling.

29. The apparatus as in claim 18, where transmitting occurs on a frame-by-frame basis.

30. The apparatus as in claim 18, where fast-feedback channels to be used begin at an end of the fast-feedback channel region, and are allocated sequentially and without gaps to the devices in a direction towards a beginning of the fast-feedback channel region, and where a beginning part of the fast-feedback channel region is used for semi-static feedback channel allocations.

31. The apparatus as in claim 18, where a particular device is instructed by said controller whether to use or not use the at least one bitmap in a period field of a channel quality indicator channel allocation information element.

32. The apparatus as in claim 18, where said controller is configurable with said the bitmap is configured for transmission by a media access protocol transmission in at least one media access protocol transmission.

33. A method, comprising:
receiving at a device at least one bitmap defining fast-feedback uplink channel allocations for individual ones of a plurality of devices, wherein defining the fast-feedback uplink channel allocations for individual ones of the plurality of devices comprises defining which of the individual ones of the plurality of devices are and are not permitted to occupy the fast-feedback channel region;
determining if the device has at least one defined fast-feedback uplink channel allocation in the at least one received bitmap; and
if it is determined that the device does have at least one defined uplink channel allocation in the at least one received bitmap, using the at least one defined uplink channel allocation to transmit feedback information, with the channel being used changing as indicated by the bitmap as the bitmap changes to maintain full occupation of the fast-feedback channel region.

34. The method of claim 33, where a plurality of bitmaps are received, the plurality of bit maps together informing individual ones of a plurality of devices of permission to use none, one or more than one particular fast-feedback channel.

35. The method of claim 34, where each bitmap comprises a plurality n of bit positions corresponding to n indices, where each particular device is identified by at least one of an associated one of the n indices, and where a bit at an index value p1 in a first bitmap and a bit at an index value p2 in a second bitmap, when concatenated together, equal a number of fast-feedback uplink channels that are allocated to the particular device, where p1 may or may not be equal to p2.

36. The method of claim 35, where a number of allocated fast-feedback uplink channels prior to the index values p1 and p2 defines a first fast-feedback uplink channel in a fast-feedback uplink channel region for use by the particular device.

37. The method of claim 34, where an absence of a particular index value in a bitmap other than the first bitmap is equivalent to a virtual index having a predetermined bit value, where the particular index value is known by a particular device.

38. The method of claim 33, where receiving receives point-to-multipoint signaling.

39. The method of claim 38, where receiving comprises receiving a request to send an acknowledgment of receipt of the at least one bitmap, and further comprising transmitting the acknowledgment indication if the device determines that it has at least one defined uplink channel allocation in the at least one received bitmap, where the acknowledgment of receipt is transmitted using at least one of a hybrid automatic repeat request acknowledgment channel, a previous channel quality indicator channel, and a shared negative acknowledgment channel.

40. The method of claim 33, where receiving occurs on a frame-by-frame basis.

41. The method of claim 33, where fast-feedback channels to be used begin at an end of the fast-feedback channel region, and are allocated sequentially and without gaps to the devices in a direction towards a beginning of the fast-feedback channel region, and where a beginning part of the fast-feedback channel region is used for semi-static feedback channel allocations.

42. The method of claim 33, where the device is instructed whether to use or not use the at least one bitmap in a period field of a channel quality indicator channel allocation information element.

43. The method of claim 33, where receiving receives a media access protocol transmission, and where receiving receives the at least one bitmap in a plurality of consecutive media access protocol transmissions.

44. The method of claim 33, performed as a result of execution of computer program instructions that are stored in a non-transitory computer-readable memory medium.

45. An apparatus, comprising:
a wireless transmitter;
a wireless receiver; and
a controller configurable with said transmitter and said receiver in a device to receive in a point-to-multipoint manner at least one bitmap defining fast-feedback uplink channel allocations for individual ones of a plurality of devices, wherein defining the fast-feedback uplink channel allocations for individual ones of the plurality of devices defining which of the individual ones of the plurality of devices are and are not permitted to occupy the fast-feedback channel region, said controller being further configurable to determine if the device has at least one defined fast-feedback uplink channel allocation in the at least one received bitmap and, if said controller determines that the device does have at least one defined uplink channel allocation in the at least one received bitmap, said controller is further configurable to use the at least one defined uplink channel allocation to transmit feedback information, with the channel being used changing as indicated by the bitmap as the bitmap changes to maintain full occupation of the fast-feedback channel region.

46. The apparatus of claim 45, where a plurality of bitmaps are received, the plurality of bit maps together informing individual ones of a plurality of devices of permission to use none, one or more than one particular fast-feedback channel.

47. The apparatus of claim 46, where each bitmap comprises a plurality n of bit positions corresponding to n indices, where each particular device is identified by at least one of an associated one of the n indices, and where a bit at an index value p1 in a first bitmap and a bit at an index value p2 in a second bitmap, when concatenated together, equal a number of fast-feedback uplink channels that are allocated to the particular device, where p1 may or may not be equal to p2.

48. The apparatus of claim 47, where a number of allocated fast-feedback uplink channels prior to the index values p1 and p2 defines a first fast-feedback uplink channel in a fast-feedback uplink channel region for use by the particular device.

49. The apparatus of claim 46, where an absence of a particular index value in a bitmap other than the first bitmap is equivalent to a virtual index having a predetermined bit value, where the particular index value is known by a particular device.

50. The apparatus of claim 49, where receiving occurs on a frame-by-frame basis.

* * * * *